(12) United States Patent
Moeckly et al.

(10) Patent No.: US 9,317,249 B2
(45) Date of Patent: Apr. 19, 2016

(54) OPERATIONS SUPPORT SYSTEMS AND METHODS FOR CALCULATING AND EVALUATING TURBINE TEMPERATURES AND HEALTH

(71) Applicant: HONEYWELL INTERNATIONAL INC., Morristown, NJ (US)

(72) Inventors: Kevin Moeckly, Chandler, AZ (US);
Richard Ling, Scottsdale, AZ (US);
Robert Sandoval, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 199 days.

(21) Appl. No.: 13/707,174

(22) Filed: Dec. 6, 2012

(65) Prior Publication Data
US 2014/0163838 A1    Jun. 12, 2014

(51) Int. Cl.
*F02C 9/00* (2006.01)
*F01D 25/00* (2006.01)
*G06F 7/00* (2006.01)

(52) U.S. Cl.
CPC ... *G06F 7/00* (2013.01); *F02C 9/00* (2013.01); *F05D 2260/80* (2013.01); *F05D 2260/81* (2013.01)

(58) Field of Classification Search
CPC ... G06F 17/5095; G06F 17/00; G07C 5/0808; G07C 5/0816
USPC ................. 701/99, 100, 101; 703/8
See application file for complete search history.

(56) References Cited

U.S. PATENT DOCUMENTS

| | | | |
|---|---|---|---|
| 4,215,412 A | 7/1980 | Bernier et al. | |
| 4,965,513 A | 10/1990 | Haynes et al. | |
| 5,018,069 A | 5/1991 | Pettigrew | |
| 5,908,176 A | 6/1999 | Gilyard | |

(Continued)

FOREIGN PATENT DOCUMENTS

| | | |
|---|---|---|
| CA | 2604118 C | 6/2010 |
| EP | 0050610 B1 | 5/1982 |

(Continued)

OTHER PUBLICATIONS

Goericke, J.et al.: Operations Support Systems and Methods with Engine Diagnostics, filed with the USPTO on Dec. 23, 2008 and assigned U.S. Appl. No. 12/342,562.

(Continued)

*Primary Examiner* — Helal A Algahaim
*Assistant Examiner* — Charles J Han
(74) *Attorney, Agent, or Firm* — Ingrassia Fisher & Lorenz, P.C.

(57) ABSTRACT

An operations support system is provided for an engine with a turbine having a turbine inlet. The system includes a diagnostic engine model unit configured to receive engine data from the engine and to generate diagnostics data based on the engine data, the diagnostics data including scalars. The system further includes an engine-specific model unit coupled to the diagnostic engine model unit and configured to receive the scalars from the diagnostic engine model unit and configured to generate turbine inlet temperature information for the engine using a thermodynamic model. The thermodynamic model is based on component maps associated with the engine. The system further includes a storage unit coupled to the engine-specific model unit and configured to store the turbine inlet temperature information.

17 Claims, 3 Drawing Sheets

(56) References Cited

U.S. PATENT DOCUMENTS

| | | | |
|---|---|---|---|
| 6,532,412 | B2 | 3/2003 | Adibhatla et al. |
| 7,058,556 | B2 | 6/2006 | Desai et al. |
| 7,071,841 | B2 | 7/2006 | Haynes et al. |
| 7,725,199 | B2 | 5/2010 | Brackney |
| 7,742,904 | B2 | 6/2010 | Healy et al. |
| 7,822,512 | B2 | 10/2010 | Thatcher et al. |
| 7,904,282 | B2 | 3/2011 | Goebel et al. |
| 7,979,147 | B1 | 7/2011 | Dunn |
| 8,050,843 | B2 | 11/2011 | von Hoff et al. |
| 2002/0193933 | A1* | 12/2002 | Adibhatla ........... F02C 9/00 701/100 |
| 2003/0074171 | A1* | 4/2003 | Desai et al. ................... 703/8 |
| 2004/0249520 | A1 | 12/2004 | Maine |
| 2004/0260454 | A1 | 12/2004 | Basir |
| 2005/0096873 | A1* | 5/2005 | Klein ......................... 702/184 |
| 2006/0047403 | A1 | 3/2006 | Volponi et al. |
| 2006/0048800 | A1 | 3/2006 | Rast et al. |
| 2007/0118271 | A1 | 5/2007 | Wiseman et al. |
| 2008/0141072 | A1 | 6/2008 | Kalgren et al. |
| 2008/0228338 | A1 | 9/2008 | Howard et al. |
| 2008/0235172 | A1 | 9/2008 | Rosenstein et al. |
| 2008/0243352 | A1 | 10/2008 | Healy |
| 2009/0173078 | A1 | 7/2009 | Thatcher et al. |
| 2009/0306839 | A1 | 12/2009 | Youngquist et al. |
| 2010/0076672 | A1 | 3/2010 | Cremers |
| 2010/0145569 | A1 | 6/2010 | Bourque et al. |
| 2010/0161154 | A1* | 6/2010 | Moeckly et al. ............ 701/3 |
| 2010/0161196 | A1* | 6/2010 | Goericke et al. .......... 701/99 |
| 2010/0228495 | A1 | 9/2010 | Leuthardt et al. |
| 2010/0280731 | A1 | 11/2010 | Snider |
| 2011/0077783 | A1 | 3/2011 | Karpman et al. |
| 2011/0202251 | A1 | 8/2011 | Luppold |
| 2013/0158832 | A1* | 6/2013 | Moeckly et al. .......... 701/101 |
| 2014/0156166 | A1 | 6/2014 | Moeckly et al. |
| 2014/0163838 | A1 | 6/2014 | Moeckly et al. |

FOREIGN PATENT DOCUMENTS

| | | | |
|---|---|---|---|
| EP | 1103926 | A2 | 5/2001 |
| EP | 1298512 | A2 | 4/2003 |
| EP | 1420153 | A2 | 5/2004 |
| EP | 1630633 | A2 | 3/2006 |
| EP | 1970786 | A2 | 9/2008 |
| EP | 2434127 | A2 | 3/2012 |
| WO | 8103079 | | 10/1981 |

OTHER PUBLICATIONS

Moeckly, K. et al. Operations Support Systems and Methods with Power Assurance, filed with the USPTO on Dec. 23, 2008 and assigned U.S. Appl. No. 12/342,633.

Moeckly, K. et al. Operations Support Systems and Methods with Power Management, filed with the USPTO on Dec. 23, 2008 and assigned U.S. Appl. No. 12/342,581.

Moeckly, K. et al. Operations Support Systems and Methods for Calculating and Evaluating Engine Emissions, filed with the USPTO on Dec. 19, 2011 and assigned U.S. Appl. No. 13/330,326.

Moeckly, K. et al. Operations Support Systems and Methods with Acoustics Evaluation and Control, filed with the USPTO on Nov. 30, 2012 and assigned U.S. Appl. No. 13/690,765.

Brotherton, T. et al. "eSTORM: Enhanced Self Tuning On-board Real-time Engine Model," Proceedings of the 2003 IEEE Aerospace Conference, Big Sky MT, Mar. 2003, pp. 1-12.

Volponi, A., et al. "Engine Health Management for Aircraft Propulsion Systems." Retrieved on Sep. 5, 2012. Retrieved from Internet: <URL: http://www.tzhealth.com/medical-devices/Flow%20Injection%20Analysis%20Systems/rotation%20position%20fuel%20flow%20fuel%20system%20pressures%20temperatures%20Urban.htm>.

Bazazzadeh, M. et al. "Improved Turbine Engine Hierarchical Modeling and Simulation Based on Engine Fuel Control System," Iranian Aerospace Society, Winter 2009, pp. 45-53, vol. 6, No. 1.

Li, Y.G. "Performance Analysis Based Gas Turbine Diagnostics: A Review," Proceedings of the Institution of Mechanical Engineers, Part A: Journal of Power and Energy, Sep. 1, 2002, pp. 363-377, vol. 216, No. 5.

Borguet, S.J. "Variations on the Kalman filter for enhanced performance monitoring of gas turbine engines." Retrieved on Sep. 6, 2012. Retrieved from Internet: <URL: http://orbi.ulg.ac.be/handle/2268/120067>.

Volponi, A.J. et al. "Development of an Information Fusion System for Engine Diagnostics and Health Management," The NASA STI Program Office . . . in Profile, Feb. 2004, pp. 1-17.

EP Search Report for Application No. 13190385.5, dated Feb. 17, 2014.

EP Examination Report for Application No. 13190385.5, dated Jul. 21, 2014.

USPTO Office Action, Notification Date Nov. 4, 2014; U.S. Appl. No. 13/911,779.

FUELFLOW_WF_lbm_per_sec.pdf (Ken Gould, Phil Weed, The Aircraft Engine Design Project Fundamentals of Engine Cycles, Spring 2009, GE Aviation, pp. 1-18).

EP Extended Search Report for Application No. EP 14168886.1 dated Jan. 26, 2015.

USPTO Office Action, Notification Date Sep. 3, 2015; U.S. Appl. No. 13/690,765.

* cited by examiner

OPERATIONS SUPPORT SYSTEMS AND METHODS FOR CALCULATING AND EVALUATING TURBINE TEMPERATURES AND HEALTH

TECHNICAL FIELD

The subject invention relates to the operations support of gas turbine engines, and more particularly, to operations support systems and methods for calculating and evaluating turbine temperatures and health.

BACKGROUND

It is desirable to monitor the health of a gas turbine engine during and after operation to ensure safe and efficient operation and to maintain appropriate maintenance schedules. As an example, it is particularly desirable to monitor the health of turbine components. One parameter that impacts the health of the turbine components is the temperature of the air flowing through the turbine inlet. Conventional health management schemes attempt to consider this parameter. However, such temperatures are currently estimated based on tracking and monitoring information relating to turbine outlet temperature and extrapolating from outlet temperatures in an attempt to estimate turbine inlet temperature. Conventional inlet temperature estimations may not be sufficiently accurate. Real-time engine temperatures depend on numerous parameters, including fuel, operating speed, other operating characteristics, and individual engine characteristics. Conventional estimations may not fully account for all of these parameters.

With these considerations, the operation and maintenance of a gas turbine engine powered aircraft would be significantly enhanced if accurate, real-time information concerning the engine turbine inlet temperatures is available. For example, knowing the turbine inlet temperatures may enable operating changes to improve inlet temperatures and/or provide health information about the engine, including information about the remaining useful life of the turbine components and other engine components.

Accordingly, it is desirable to provide improved operations support systems and methods that generate improved turbine inlet temperature information and associated health information. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an operations support system is provided for an engine with a turbine having a turbine inlet. The system includes a diagnostic engine model unit configured to receive engine data from the engine and to generate diagnostics data based on the engine data, the diagnostics data including scalars. The system further includes an engine-specific model unit coupled to the diagnostic engine model unit and configured to receive the scalars from the diagnostic engine model unit and configured to generate turbine inlet temperature information for the engine using a thermodynamic model. The thermodynamic model is based on component maps associated with the engine. The system further includes a storage unit coupled to the engine-specific model unit and configured to store the turbine inlet temperature information.

In accordance with an exemplary embodiment, a method is provided for supporting operations of an engine with a turbine having a turbine inlet. The method includes collecting engine data; generating condition indicators from the engine data using a thermodynamic model based on component maps associated with the engine; calculating turbine inlet temperature information of the engine from the condition indicators; and storing the turbine inlet temperature information.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein relate to operations support systems and methods. More specifically, exemplary embodiments include an engine-specific model unit that receives engine information associated with an aircraft engine and generates engine temperature information using a thermodynamic model. The thermodynamic model may be based on component maps and modified based on scalars. The temperature information may be, for example, the inlet temperature of the turbine and used to determine the health of the turbine components, including the remaining useful life of the turbine components.

Figure 1:
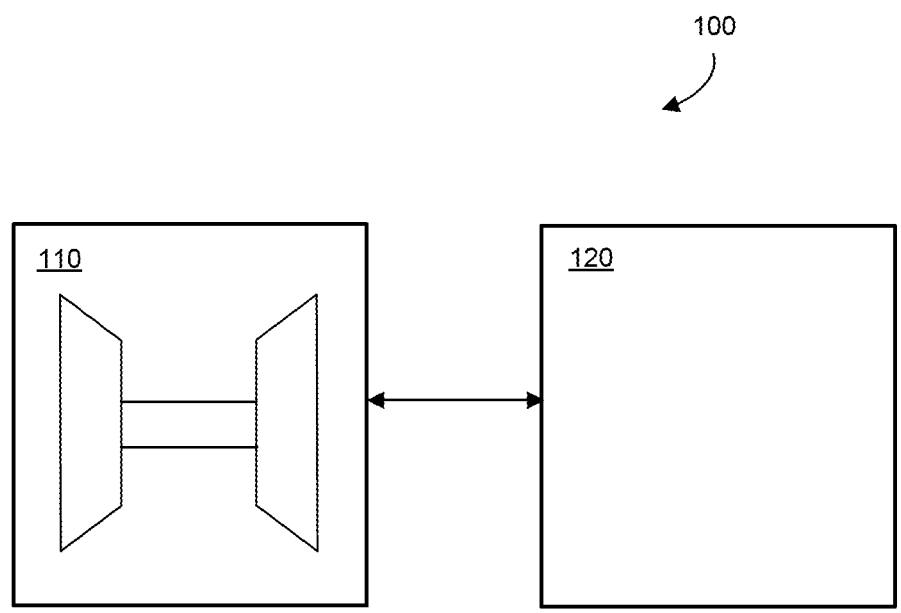
FIG. 1 is a block diagram of an aircraft system in accordance with an exemplary embodiment.

FIG. 1 is a block diagram of an aircraft system 100 in accordance with an exemplary embodiment. In general, the aircraft system 100 includes an engine system 110 and an operations support system 120. The engine system 110 may include a gas turbine engine, such as an engine for an aircraft. In one exemplary embodiment, the engine system 110 can include compressors that supply compressed air to a combustor. The compressed air can be mixed with fuel and ignited in the combustor to produce combustion gases. The combustion gases are directed to high pressure and low pressure turbines that extract energy, for example, to provide horsepower. In general, the system 100 disclosed herein may be employed in conjunction with any gas turbine engine configuration. In one exemplary embodiment, the engine system 110 is a gas turbine engine for an aircraft, such as a helicopter, although other applications are also possible. As examples, exemplary embodiments of the system 100 may also be utilized in spacecraft, ships, submarines, and other types of vehicles, as well as industrial applications. For simplicity, embodiments are described below with reference to "aircraft." The operations support system 120 may be used to support a single engine system 110 or a number of engines, such as for a fleet of aircraft.

The operations support system 120 generally supports and sustains operation of an engine system 110. For example, the operations support system 120 processes engine data from the engine system 110; provides information about the engine system 110 to the pilot, maintenance crew, and other interested parties; and optionally, controls operation of the engine system 110. As described below, the operations support system 120 additionally provides information about various measured or calculated parameters, including real-time or current turbine inlet temperature information and resulting health predictions based on the turbine inlet temperature information.

In general, the operations support system 120 is located on-board the aircraft. However, any of the components of the operations support system 120 may be alternatively located off-board the aircraft or a combination of on-board and off-board the aircraft. In one exemplary embodiment, the operations support system 120 may be embedded on-board an aircraft within a Full Authority Digital Engine Control (FADEC), an engine control unit (ECU), or a Health and Usage Monitoring Systems (HUMS) unit.

Figure 2:
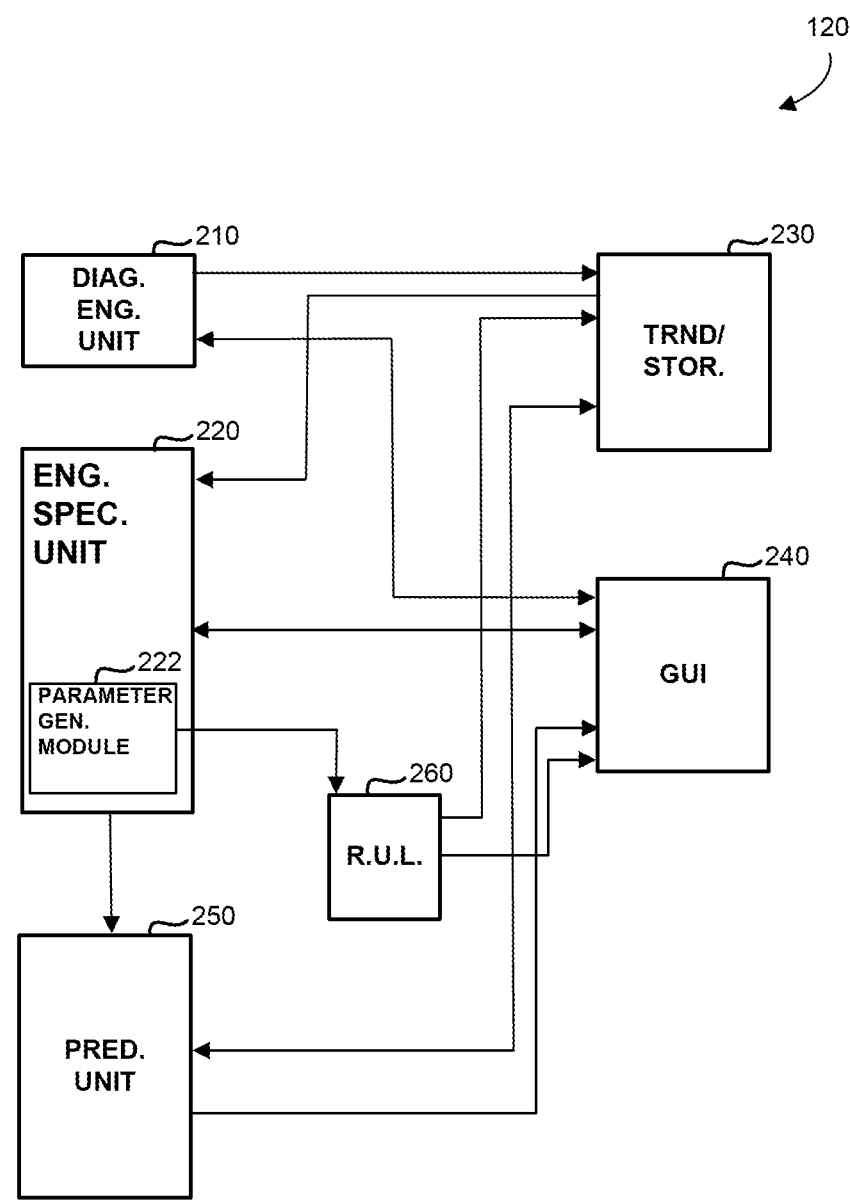
FIG. 2 is a block diagram of an operations support system for supporting and sustaining operation of an engine in accordance with an exemplary embodiment.

FIG. 2 is a more detailed, block diagram of the operations support system 120 of FIG. 1. As shown, the operations support system 120 includes a number of functional units or modules 210, 220, 230, 240, 250, including diagnostic engine model unit 210, an engine-specific model unit 220, a data trending and storage unit 230, a graphical user interface (GUI) 240, and a predictive model unit 250. The units 210, 220, 230, 240, 250 each contain or share processing components necessary to accomplish the individual and collective functions discussed in greater detail below. As some examples, the processing components may include digital computers or microprocessors with suitable logic circuitry, memory, software and communication buses to store and process the models within the units discussed below.

As described below, the operations support system 120 receives data from various parts of the aircraft and such data may be generated by the on-board the aircraft or received from external systems, aircraft, or ground operations that are off-board the aircraft. In particular, the operations support system 120 may receive aircraft instrumentation data from, for example, the cockpit, pilot, or other system and engine instrumentation data from the engine system 110 (FIG. 1).

In one exemplary embodiment, the operations support system 120 includes a diagnostic engine model unit 210 that receives the aircraft instrumentation data and engine instrumentation data as input parameters. As an example, the aircraft instrumentation data and the engine instrumentation data may include any suitable type of data related to the engine or aircraft, such as for example, one or more of the following: engine operating hours; static pressure, total pressure, relevant variable geometry, and temperature at various positions within the engine system 110 (FIG. 1), such as positions associated with the compressors, combustor, and turbines; gas producer speed; engine torque; engine torque sensor voltage; temperature at the oil resistance bulb; and metered fuel flow. Other engine data can include the calibrated airspeed of the aircraft, ambient temperature, and ambient total pressure. In general, any and all parameters available to systems 110, 120 are available for use by diagnostic engine model unit 210. The diagnostic engine model unit 210 generally evaluates the input parameters and generates diagnostic indicators with a diagnostic model, as discussed below.

The diagnostic model of the diagnostic engine model unit 210 develops scalars for each engine major engine component. The diagnostic scalars are collected, trended, and statistically and otherwise evaluated to produce a broad range of scalars for each component that, at this point, represents the true aspects of that component. These components are usually but not limited to the aerodynamic rotational as well as static components that make up the gas path and operational entity of the gas turbine engine of the engine system 110 (FIG. 1) that are in basic form represented by maps within the engine model. In one exemplary embodiment, the diagnostic engine model unit 210 provides signal conditioning such as in-range and signal validity checks, unit conversion, scaling, filter/sampling, and steady state detection. The diagnostic engine model unit 210 provides the diagnostic indicators to the data trending and storage unit 230, as will be discussed in greater detail below.

The diagnostic indicators from the diagnostic engine model unit 210 are also provided to an engine-specific model unit 220. The engine-specific model unit 220 includes high-fidelity mathematical representation of the engine system 110 (FIG. 1) for steady state engine diagnostics. This mathematic representation may be referred to as an engine-specific model. The diagnostic indicators from the diagnostic engine model unit 210 are processed through appropriate filtering and trending before being passed to the engine-specific model, which now generates engine output parameters representing the current states of the actual engine in real time. This engine-specific model may produce condition indicators as well as any aerodynamic or thermodynamic engine parameter of the running engine, as discussed below. As noted above, the diagnostic scalars are developed in the diagnostic engine model. As the diagnostic scalars are applied to the engine-specific model unit 220, which is a similar model to that of the diagnostic engine model unit 210, without the diagnostic capability of the model, the model becomes a model specific to the engine when generating the aerodynamic and thermodynamic engine parameters. In other words, at this point the model is an engine-specific model and represents only that particular engine at that point in time.

Generally, the engine specific model is embedded in the operations support system 120 to provide continuous engine monitoring for health and/or other types of engine attributes. Engine diagnostics are achieved through adaptation of specific component parameters as diagnostic scalars within the diagnostic model to measured engine states.

In one embodiment of the engine-specific model unit 220, scalars are the difference between expected engine states and the actual engine states. These differences could be a result, for example, of engine-to-engine differences and/or erosion of engine components. In one example, the scalars can represent the erosion of the turbine blades. The scalars may be utilized as coefficients, biases, and adders used to adjust the aero-thermodynamic representation of the model. As one example, the scalars function to scale engine component airflows and efficiencies to match the measured data. This matching process is accomplished by executing an adaptive algorithm that iteratively adjusts or adapts the nominal engine component efficiencies using the scalars. As such, the thermodynamic engine model accurately mirrors actual engine performance over time, and the model is improved as an engine-specific model.

The model of the engine-specific model unit 220 is complete over the entire operating range of the engine system 110 (FIG. 1). The model is true to the workings of the actual gas turbine engine system 110 (FIG. 1), and the manifestations of component-level as well as engine-level performance changes from what would be considered a "nominal" engine are superior to empirical, algorithm-based models. In contrast, the interaction of empirical, algorithm-based models can easily become skewed or distorted from "true" performance, yet this distortion is not inherently obvious when analyzing model-produced results from such a system. A component-level map-based aero-thermodynamic physics model is much more robust and accurate over the lifespan of an engine and produces higher fidelity representations of its components.

In summary, the engine-specific model unit 220 uses one or more component-level, map-based aero-thermodynamic models to generate aerodynamic and thermodynamic engine parameters that characterize a specific engine, which in turn produces an engine-specific model that is a high-fidelity representation of the engine itself. The engine-specific model unit 220 provides the engine diagnostic scalars to the data trending and storage unit 230, as will be discussed in greater detail below. The engine-specific model unit 220 may be in contrast to an algorithm-based system that uses mathematical equations to try to develop relationships between one parameter and one or more parameters in the engine. These conventional models may lose accuracy as the engine deviates from a "nominal" state over time or into more extreme operation, away from where the algorithms were developed. In contrast, the model of the engine-specific model unit 220 represents the true aero-physical relationships in the engine in the same way a map-based component-specific model does. Because the component maps have first been developed with high-fidelity design practices and tools, then tested extensively in strictly-controlled "rigs" over the complete operating range of the component, and subsequently confirmed in the engine with multiple highly-instrumented, highly controlled engine-level testing, the map-based components may offer an advantageous representation of a gas turbine engine and the associated engine performance.

The generated engine-specific model calculates vital parameters for accurate turbine inlet temperatures, turbine interstage temperatures and pressures, cooling/secondary air flows and temperatures and pressures, combustor inlet temperatures and pressures, combustor exit temperatures and pressures, combustor loading, fuel flow, and airflows. Where some of these parameters can be measured on more advanced gas turbine engines, this system can still provide accurate calculations for parameters that are not easily measured in an actual application, such as turbine inlet temperatures, as will now be discussed.

In one exemplary embodiment and as introduced above, the engine-specific model unit 220 generates parameters associated with the engine. Such parameter generation is represented in FIG. 2 as the parameter generation module 222, although the parameters may be generated by the engine-specific model unit 220 discussed above.

As noted above, the engine diagnostics unit 210 processes the engine and aircraft data to establish component map-specific scalars, engine health, and component health. The engine-specific model unit 220 accesses arrays of component map scalars that have been filtered, processed, and trended to provide a level of confidence accumulated over the life the engine. The engine-specific model unit 220 may, for example, run parallel to any models or algorithms of the engine diagnostics unit 210. The engine-specific model unit 220, represented by the parameter generation module 222, generates (or otherwise calculates) parameters within the engine cycle that either cannot or are not measured on the running engine itself. The parameters may include various pressures, temperatures, airflow and velocities. One such parameter generated at the parameter generation module 222 the real-time temperatures at the turbine inlet of the engine system 110. As such, this turbine inlet temperature may be based on engine data from the diagnostic engine model unit 210, data from data trending and storage unit 230, and engine diagnostic scalars from other portions of the engine-specific model unit 220. The embedded inlet temperature parameter may be empirically established to use the pertinent gas path parameters to accurately calculate turbine inlet temperatures. For example, the inlet temperature parameter may be a function of may use gas properties, temperatures and pressures and flows, and fuel flows, temperatures, and properties throughout the engine system. This model may more easily lend itself to accurate temperature calculations using such model-generated information. The coding may be updated or modified if new information becomes available. Typically, obtaining an accurate, direct measure of temperature characteristics may be difficult, but the model-based approach enables a reliable and accurate calculation. The engine-specific model unit 220 provides the real-time turbine inlet temperature to the data trending and storage unit 230 and the remaining useful life calculation unit 260. For example, the turbine inlet temperature information may be considered with aircraft avionics or other positioning system to track temperature over various parameters.

As discussed above in reference to the engine-specific model unit 220 uses a model in which the engine component scalars are not reacting to engine data to establish an engine-specific, accurate representation of the actual engine. As such, the engine-specific model unit 220 may be able to continuously determine the turbine inlet temperature at a specific rating condition (altitude, power, installation configuration, etc.).

The predictive model unit 250 receives the engine diagnostic scalars and other relevant data from the engine-specific model unit 220 and evaluates the scalars with a thermodynamic model similar to that of the engine-specific model unit 220 with the exception that the thermodynamic model of the predictive model unit 250 does not react to engine data. As such, the predictive model unit 250 may have a model similar to that of the engine-specific model unit 220 except that the model is predictive. In particular, the predictive model unit 250 trends the component scalars over and projects the diagnostic scalars from the present to a time in the future to establish an engine-specific prediction model to forecast engine performance under user-supplied conditions as prognostic indicators. In "predictive" mode, the model is no longer "engine-specific," but is a "future engine-specific" model. As such, the model of the predictive model unit 250 may then be used to predict engine performance at a specific rating condition (e.g., inlet temperature, altitude, power, installation configuration, and the like) to produce prognostic indicators. The predicted engine performance from the predictive model unit 250 is also provided to the data trending and storage unit 230. The output that may be trended includes engine output performance, such as temperatures, fuel flow, speeds, and powers, as well as specific component efficiencies, airflows, and pressure ratios. As such, the predictive model unit 250 may generate parameters similar to the engine-specific model unit 250, albeit at predetermined environmental and engine-operating conditions, and such parameters may include, as above, the turbine inlet temperature.

With proper scalar conditioning, the results are not prone to variation, yet accurately track engine health changes. With trending logic and historical health analysis, this technique may also detect sudden changes in engine health from events such as foreign object damage or installation changes. This model therefore accounts for not only changes in overall engine health, but accounts for changes in health of each major aerodynamic component in the engine.

As noted above, the predictive model unit 250 may receive the turbine inlet temperature calculations from the turbine inlet temperature calculation unit 222. Based on this information, the predictive model unit 250 may estimate the turbine inlet temperature of future engine use. The predicted turbine inlet temperatures are provided to the data trending and storage unit 230.

In one exemplary embodiment, the engine system 110 further includes a remaining useful life calculation unit 260. In particular, the remaining useful life calculation unit 260 may estimate the remaining useful life of turbine components based on the turbine inlet temperature information and other engine parameters.

As noted above, the parameter generation module 222 of the engine-specific model unit 220 continuously generates turbine inlet temperature values based on engine operating conditions, which may be monitored and summed over specific time intervals to produce total time-at-temperature. This information may be used by the remaining useful life calculation unit 260 to determine the remaining useful life of any of the high-temperature turbine components. In one exemplary embodiment, the remaining useful life calculation unit 260 may additionally monitor rotation speed and temperature information about cooling airflows for turbine components (e.g., from compressor discharge), which may be paired with turbine inlet temperature for enhanced lifting calculations. Turbine component remaining useful life may therefore be instantly calculated from these available parameters, providing real-time remaining life capability.

Similar to the engine-specific model unit 220 discussed above, the remaining useful life calculation unit 260 may use a thermodynamic, engine-specific model used to predict engine performance and in this case, specifically turbine inlet temperature, at a specific rating condition (inlet temp, altitude, power, installation configuration, etc.). From this information, the remaining useful life calculation unit 260 may calculate component damage, integrating the results over time to be able to determine remaining useful life.

Although not shown, the turbine inlet temperature information may be provided to an engine control unit to determine if engine operation may be modified to lower the temperatures and/or operate at higher temperatures. For example, with information about current temperatures, the control of these temperatures may be implemented using available engine-controllable variables to alter the engine state while meeting engine output requirements and/or adjusting engine output. In one exemplary embodiment, operation modification may include varying engine speed, variable geometry, engine bleed, fuel flow, fuel choice, exhaust parameters, and/or environmental changes. Such engine control may occur automatically and/or in the form of suggestions for pilot intervention or choice in engine operating mode.

The turbine inlet temperature information and other parameters, including the remaining useful life calculations, may be provided to a graphical user interface (GUI) 240, for example, located in the aircraft cockpit for consideration by the pilot. The GUI 240 typically includes at least a display device and a user input device. The GUI 240 generally includes any suitable display device for displaying the information described herein and an input device for interacting with the operations support system 120. Such displays may include any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.). The GUI 240 may form part of a Primary Flight Display and/or Multi-Function Display Unit. The GUI 240 may include a graphics display generator for generating the appropriate display commands and resulting symbology, as discussed in greater detail below. In general, the user input device allows a user (e.g., pilot, co-pilot, or crew member) to interact with the operations support system 120 and may be realized as a keypad, touchpad, keyboard, mouse, touchscreen, joystick, microphone, interactive display widget, and/or another suitable device or mechanism adapted to receive input from a user. In this embodiment, the GUI 240 is located within a cockpit of the aircraft. It should be appreciated that, in practice, the GUI 240 may be located outside the aircraft (e.g., on the ground as part of an air traffic control center or another command center) and communicatively coupled to the aircraft.

As noted above, the data trending and storage unit 230 may receive data from a number of sources, including input parameters from the engine (e.g., engine system 110), diagnostic indicators from the diagnostic engine model unit 210, engine parameters from the engine-specific model unit 220, prognostic indicators from the predictive model unit 250, and parameters such as the turbine inlet temperature information from the parameter generation module 222. As such, the data trending and storage unit 230 may include any suitable database or storage medium and processing components necessary for receiving, storing, and providing relevant information to the various units 210, 220, 240, 250 and/or external systems. For example, the data trending and storage unit 230 provides binning and storing of this data, as well as statistical analysis and trending for use in historical analysis or temperature performance over time. Data trending of the temperature calculations may be used to increase confidence in these numbers.

As an historical storage unit 230, the operations support system 120 provides evidence of not only temperatures of the turbine inlet at any chosen time, but also as evidence of cumulative temperature over a chosen segment of time. With historical records of turbine inlet temperature, and trending versus time, usage level, and location, projections may also be made as to temperature levels in the future. In this way, an engine may be designated for maintenance actions. Trending of data also provides the opportunity to remove certain data or predictions if determined to be an anomalous. With an appropriate database of past engine performance and turbine inlet temperature, any number of projections or uses of this history may be made.

In one exemplary embodiment, statistical analysis of the data collected and generated by the operations support system 120 in the data trending and storage unit 230 may be considered by a maintenance unit (not shown) to determine if the engine requires maintenance. For example, such data may result in the ground crew adjusting the maintenance schedule of the aircraft and/or taking corrective action with respect to turbine issues.

Figure 3:
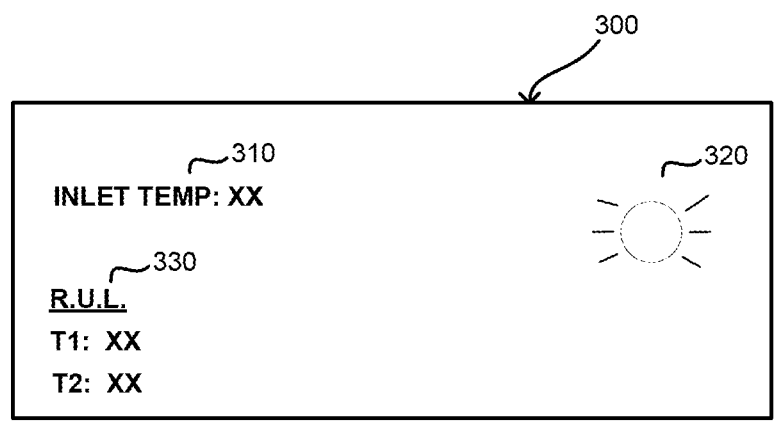
FIG. 3 is a schematic representation of a visual display rendered on a graphical user interface of the operations support system of FIG. 2 in accordance with an exemplary embodiment.

FIG. 3 is a visual display 300 rendered on the GUI 240 in accordance with an exemplary embodiment. The visual display 300 may include any of the parameters, inputs and/or outputs discussed above, including health indicators, engine input data, diagnostic scalars, maintenance information, and the like. In this exemplary embodiment, the visual display 300 includes turbine inlet temperature information 310. The turbine inlet temperature information 310 includes the air temperature at the turbine inlet (e.g., in ° F.), and in some embodiments, the temperatures may be presented with respect to time. As shown in FIG. 3, the turbine inlet temperature may also prompt warning or messages 320 if the temperature exceeds a predetermined limit. As also shown in FIG. 3, the visual display 300 may provide remaining useful life information for a component or system. In the depicted embodiment, the remaining useful life information 330 includes the remaining useful life of the turbines (e.g., in hours or distance). In general, any suitable display or graphical representations may be provided.

As noted above, the operations support system 120 is discussed in conjunction with an aircraft engine. However, other types of engine applications may be provided. Applicable engine applications include, but are not limited to, airplane propulsion (fan, turbojet, turboshaft, turboprop), helicopter propulsion (turboshaft), and aircraft auxiliary power units, ground power unit, power generation sets, shipboard power systems, and industrial gas turbines.

As such, the operations support system 120 enables improved calculation of turbine inlet temperature information and other engine-specific parameters, thereby enabling improved health prognostics such as remaining useful life. For example, turbine life may be impacted by flowpath temperature levels, and inaccuracy in turbine inlet temperature may lead directly to inaccuracies in the determination of remaining useful life of hot section components like turbine blades, nozzles, shrouds, and the like. Moreover, the sensitivity of component life to turbine inlet temperature depends on both failure mode (creep, oxidation, fatigue, etc.) and component configuration (e.g., cooled vs. uncooled). For an uncooled turbine blade, which may be limited by a creep failure mechanism, the inaccuracy in turbine inlet temperature may lead to an inaccuracy in blade metal temperature that is nearly the full amount of the turbine inlet temperature error. As an example, a typical rule of thumb for creep failure mechanisms is that a change of 25° F. in metal temperature results in a life credit or debit of double, e.g., errors as small as 5° F. in metal temperature may result in 15% creep life error. Oxidation and fatigue mechanisms additionally have sensitivities to temperature. In the gas turbine industry where cost of engine operation and maintenance is expensive, improved accuracy in remaining useful life algorithms on the order of 5-15% offers significant cost-of-ownership savings as a result of potential improvements in engine maintenance intervals and reducing the risk of component failures.

This enables safer and more efficient operation and maintenance. For example, the system may therefore more accurately determine component damage by using turbine inlet temperature rather than turbine exit temperature and provide on-board analytical techniques to determine remaining useful life and health tracking for historical purposes. The system uses a derived turbine inlet temperature that is inherently more accurate because it accounts for many additional factors and conditions about the engine and the individual component performance, e.g., calculation models are updated as the state of the engine health changes.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An operations support system for an engine with a turbine having a turbine inlet, comprising:
   a diagnostic engine model unit configured to receive engine data from the engine and to generate diagnostics data based on the engine data, the diagnostics data including scalars;
   an engine-specific model unit coupled to the diagnostic engine model unit and configured to receive the scalars from the diagnostic engine model unit and configured to generate turbine inlet temperature information for the engine using a thermodynamic model, the thermodynamic model being based on component maps associated with the engine;
   a predictive model unit coupled to the engine-specific model unit and configured to evaluate the turbine inlet temperature information, wherein the predictive model unit is configured to generate prognostic indicators of components of the turbine based on turbine inlet temperature information; and
   a storage unit coupled to the engine-specific model unit and configured to store the turbine inlet temperature information.

2. The operations support system of claim 1, wherein the engine-specific model unit is configured to generate condition indicators based on the diagnostics data using the thermodynamic model.

3. The operations support system of claim 1, further comprising a graphical user interface coupled to the engine-specific model unit and configured to display the turbine inlet temperature information.

4. The operations support system of claim 1, wherein further comprising a remaining useful life calculation unit coupled to the engine-specific model unit and configured to generate remaining useful life of the components of the turbine based on the turbine inlet temperature information, wherein the remaining useful life calculation unit is further configured to generate the remaining useful life based on rotation speed of the engine and cooling air flow temperature information paired with the turbine inlet temperature information.

5. The operations support system of claim 4, wherein the remaining useful life calculation unit is configured to generate a warning indication based on the remaining useful life of the components of the turbine.

6. The operations support system of claim 1, wherein the engine-specific model unit is configured to calibrate the calculation of the turbine inlet temperature information.

7. The operations support system of claim 1, wherein the engine-specific model unit is configured to calculate the turbine inlet temperature information in real-time, and wherein the engine-specific model unit is further configured to generate turbine inlet temperature information based on engine operating conditions that are monitored and summed over time intervals to produce total time-at-temperature.

8. The operations support system of claim 1, wherein the engine-specific model unit is configured to calculate the turbine inlet temperature information based on at least one of engine temperature, engine air pressure, engine air flow, engine fuel flow, and engine speed.

9. The operation support system of claim 1, wherein the engine-specific model unit is configured to continuously determine the turbine inlet temperature information of the engine at a specific rating condition of engine temperature, altitude, power, and installation configuration.

10. The operations support system of claim 1, wherein the engine-specific model unit is further configured to adjust the thermodynamic model based on the scalars.

11. The operations support system of claim 10, wherein the thermodynamic model is an engine-specific model.

12. The operations support system of claim 11, wherein at least a portion of the scalars represent erosion within the engine.

13. A method for supporting operations of an engine with a turbine having a turbine inlet, comprising:
   collecting engine data;
   generating condition indicators from the engine data using a thermodynamic model based on component maps associated with the engine;
   calculating turbine inlet temperature information of the engine from the condition indicators at a specific rating condition of engine temperature, altitude, power, and installation configuration;
   evaluating the turbine inlet temperature information with a predictive model unit coupled to the engine-specific model unit, including generating prognostic indicators of components of the turbine based on turbine inlet temperature information; and
   storing the turbine inlet temperature information.

14. The method of claim 13, further comprising displaying the turbine inlet temperature information on a graphical user display.

15. The method of claim 13, wherein the generating step includes generating remaining useful life of the components of the turbine based on the turbine inlet temperature information.

16. The method of claim 15, further comprising
   generating scalars from the engine data using the thermodynamic model; and
   adjusting the thermodynamic model based on the scalars.

17. The method of claim 16, wherein the calculating step includes continuously calculating a remaining useful life of the components of the engine.

* * * * *